(12) United States Patent
Feller

(10) Patent No.: US 7,574,924 B1
(45) Date of Patent: Aug. 18, 2009

(54) MAGNETIC FLOW METER

(76) Inventor: Murray F Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 12/038,884

(22) Filed: Feb. 28, 2008

(51) Int. Cl.
  *G01F 1/58* (2006.01)
  *G01F 1/00* (2006.01)
(52) U.S. Cl. ..................... 73/861.12; 702/45
(58) Field of Classification Search .............. 73/861.12, 73/861.16, 861.17, 861.13, 861.15; 702/45–47, 702/49, 50, 64, 65, 75, 78, 79, 127, 189, 702/176–178; 324/117, 750
See application file for complete search history.

(56) References Cited

U.S. PATENT DOCUMENTS

| | | | | |
|---|---|---|---|---|
| 4,204,240 A | * | 5/1980 | Schmoock | 361/152 |
| 4,559,495 A | * | 12/1985 | Lienhard | 324/117 R |
| 5,844,143 A | * | 12/1998 | Tomita | 73/861.12 |
| 6,118,284 A | * | 9/2000 | Ghoshal et al. | 324/750 |
| 6,431,011 B1 | | 8/2002 | Feller | |
| 6,463,807 B1 | | 10/2002 | Feller | |
| 7,260,486 B2 | * | 8/2007 | Budmiger | 702/45 |

* cited by examiner

*Primary Examiner*—Jewel Thompson
(74) *Attorney, Agent, or Firm*—David Kiewit

(57) ABSTRACT

A magnetic flow meter employs resonant circuit principles to increase the strength of the magnetic field to produce larger electrode difference potentials so that environmental influences have less effect on the operation of the flow meter. The flow meter may use an electromagnet that is resonant with a capacitor, generally at a frequency on the order of ten kHz. In addition, the meter comprises a magnetic field sensor and timing circuits that can sample the electrode difference potentials when the field is at a maximum and the time rate of change of field is instantaneously zero. Some versions of the meter operate in a one-shot mode and others operate with a burst of drive pulses.

12 Claims, 2 Drawing Sheets

MAGNETIC FLOW METER

BACKGROUND OF THE INVENTION

1. Field of the Invention

This invention relates to apparatus and method for determining the rate of flow of a fluid by measuring the potential difference developed in the fluid as it moves through a magnetic field produced by an electromagnet.

2. Background Information

In a magnetic flow meter an electrical potential difference developed in the fluid is detected by a pair of electrodes spaced apart from each other along a line generally orthogonal to both the direction in which the flow is measured and a magnetic field. This arrangement is used both in full bore sensors, where the electrodes are typically mounted in electrically insulated liners inside of metal shells, and in insertion probe meters, where the electrodes are mounted on a bottom or side of a probe.

In typical operation the magnetic field is periodically energized to provide a stable magnetic field for a period of time during which the difference in the electrode signal is amplified and detected to provide a measure of flow rate. Although various methods, such as the reversal of the magnetic field polarity and referencing to electrode signal potential in the absence of the magnetic field, are employed in the current art to reduce drift and susceptibility to interfering signals, these problems can still be troublesome. These problems are commonly more severe when the sensor is configured as a probe, which has smaller spacing between sensing electrodes than does a full-bore meter, which leads to a reduction in the magnitude of the sensed voltage and thus to a reduced signal to noise ratio.

BRIEF SUMMARY OF THE INVENTION

One aspect of the invention is that it provides a magnetic flow meter for measuring a flow rate of a fluid flowing along a flow direction. The meter comprises an electromagnet operable to produce a magnetic field transverse to the flow direction when current flows through a coil portion of the electromagnet. For reasons that are discussed later on in this document, this electromagnet is preferably a component in a resonant circuit. In addition, the meter comprises a magnetic field sensor operable to sense the magnitude of the magnetic field and to provide an output representative of that field to a timing circuit. The timing circuit is operable to determine when the magnitude of the field is invariant with time within a resonant period and provides an output to a signal voltage measurement circuit operable to sample a voltage between two electrodes responsive to the output from the timing circuit.

Another aspect of the invention is that it provides a method of operating a magnetic flow meter for measuring a flow rate of a fluid flowing along a flow direction. This method involves applying at least one current pulse from a pulsed current source selected for resonant operation with an electromagnet having a coil axis arranged transverse to the flow direction. A magnitude of a magnetic field generated by the electromagnet during the at least one pulse is then measured and at least one instant during which the magnetic field is constant is determined. During the constant field instant a voltage is measured between two electrodes contacting the fluid and spaced apart along a line transverse to both the flow direction and the coil axis. The overall flow rate is then calculated from this voltage.

One focus of the present invention is to increase the strength of the magnetic field to produce larger electrode difference potentials so that environmental influences have less effect on the operation of the flow meter. In a preferred embodiment, this is accomplished by using the electrical energy available to energize the electromagnet more cost effectively and more efficiently. Rather than energize the magnet and stabilize its field for a period of time to minimize electrode noise pickup from the process of generating the field, the invention provides apparatus and method for operating the electromagnet more quickly. In one embodiment this is done by periodically energizing the coil with a burst of sine waves. At the peaks of the positive and negative excursions of these waves the current through the electromagnet coil reaches a peak and is temporarily invariant. At those selected times the difference in the amplified electrode signals is amplified, detected and processed to yield the flow rate signal. In another embodiment the electromagnet is energized in a one-shot fashion by discharging a capacitor.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions and usages are within the spirit and scope of the invention in its broadest form. Moreover, it may be noted that different embodiments of the invention may provide various combinations of the recited features and advantages of the invention, and that less than all of the recited features and advantages may be provided by some embodiments.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. At the outset of this Description it may be noted that apparatus of the invention comprises an electromagnet having a coil, and often having a core. As is conventional in the art, the ensuing disclosure describes electrical connections to the electromagnet and to the coil thereof interchangeably. That is, the reader will understand that described connections to an electromagnet will stand for connections to the coil thereof. Moreover, operation of the electromagnet is described with respect to operation with one or more current pulses during which the magnetic field of the electromagnet increases to a maximum value where the time rate of change of the field is at least instantaneously zero. For any selected combination of frequency of operation and precision of measurement there is a time interval during which deviations from the actual zero value are inconsequential. In the ensuing discussion this time interval is described as a time during which the field is temporarily invariant. Additionally, terms such as "magnetic field sensor" are to be understood as standing for any of a sensor that directly senses the magnetic field, such as a hall effect device; and a sensor that indirectly measures the magnetic field by measuring a voltage or current which is representative thereof the magnetic field, for example, the voltage across a resistor through which the coil current is flowing.

Figure 1:
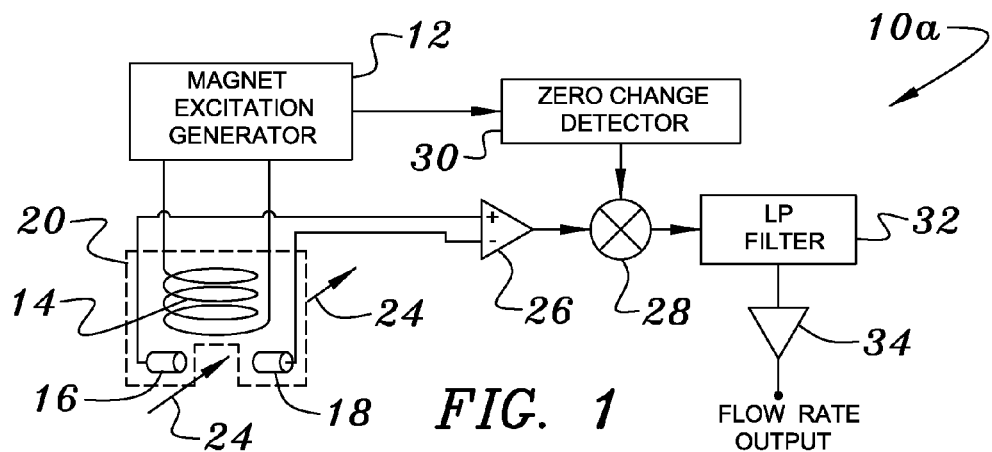
FIG. 1 is a schematic block diagram of a multi-pulse flow meter of the invention.

Turning now to FIG. 1, one finds an overall block diagram of a first preferred apparatus of the invention. A flow meter 10a comprises, as a current source, a magnet excitation generator 12 connected to a coil 14 of an electromagnet, which is inside an environmentally protective electrically insulating enclosure 20. The lower end of the magnet projects magnetic flux down into a fluid having a flow direction indicated by an arrow 24. This generates an electrical potential in the fluid which is sensed at the electrodes 16, 18. A differential amplifier 26 amplifies the electrode potential difference and provides its output signal to an amplitude detector 28 which is enabled by the zero change detector 30 to operate only during times when the magnetic flux is at a maximum and is not changing. The output from the detector 28 is smoothed by a low pass filter 32 and fed to an output amplifier 34, which provides a flow rate output signal.

The magnet excitation generator 12 provides periodic bursts of alternating current through the magnet at which time the zero change detector is enabled. In the operation of the flow meter 10a, the zero change detector 30 senses when the magnetic field is at a maximum and is temporarily invariant. At this time it provides an enable pulse to the amplitude detector to determine when the amplified electrode signal from the amplifier 26 is to be detected. In this measurement, the zero change detector 30 may use, as a magnetic field sensor, a low value current sensing resistor in series with the magnet, a Hall effect magnetic sensor, a current transformer, or any other magnetic or current sensor known to the art. When compared to the prior art, this approach advantageously reduces the electrical energy required to excite the magnet 14.

Figure 2:
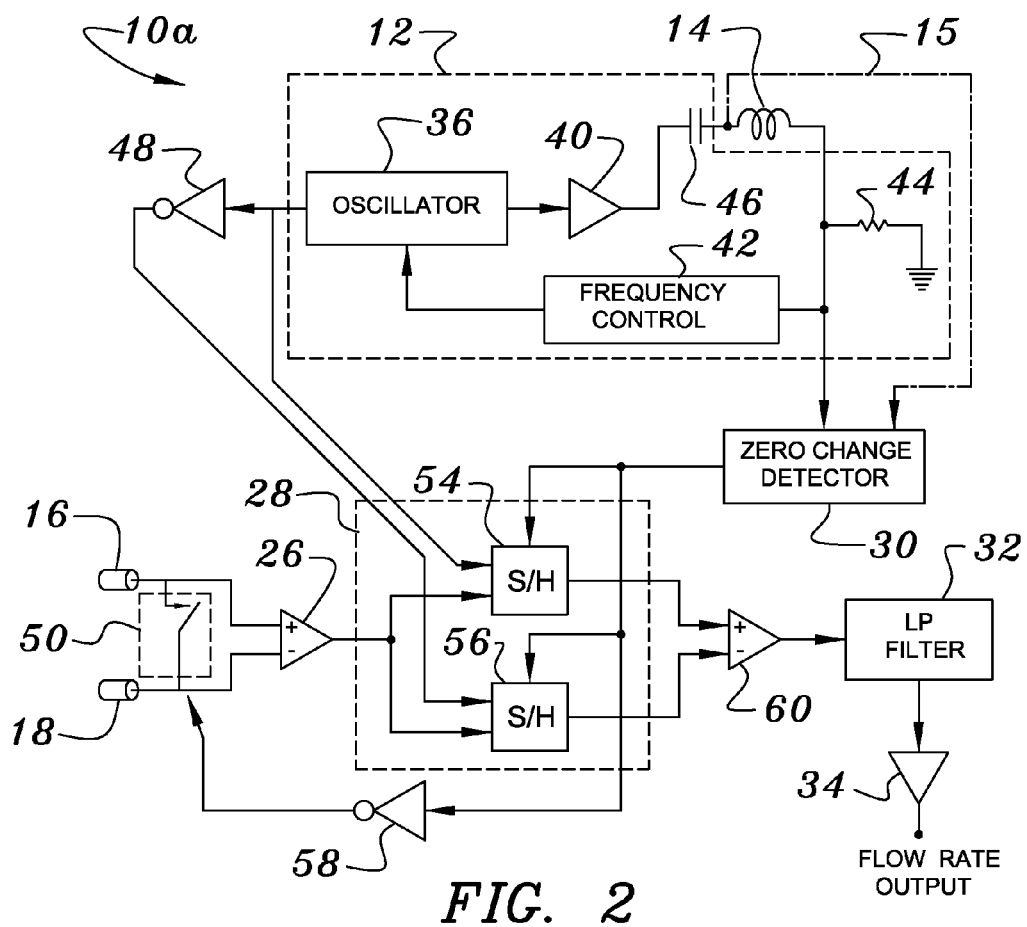
FIG. 2 is a schematic block circuit diagram of a preferred embodiment of the flow meter of FIG. 1.

FIG. 2 depicts the first preferred embodiment in greater detail. The magnet excitation generator 12 comprises an oscillator 36, an amplifier 40, a frequency controller 42 and a current sensing resistor 44. The generator 12 energizes the magnet 14 through a capacitor 46. Sample and hold circuits 54, 56 of the detector 28 are enabled by the zero change detector 30 which is used to determine, by measuring a voltage across the resistor 44, when the electromagnet current is at a maximum and not changing. The sample and hold circuits are also enabled in an "AND" logic function both by an oscillator 36 and through an inverter 48 so that the sample and hold circuits function alternately, corresponding to the polarity of the electromagnet current. The electrodes 16, 18 are preferably connected to at least one switch 50 which is enabled by the zero change detector through the inverter 58 to short circuit the electrode signals except during the time when the sample and hold circuits are operating. Those skilled in the art will appreciated that this operation could also be carried out by separately connecting the two electrodes to a common potential, such as ground. The differential amplifier 26 provides the amplified differential electrode signal to the sample and hold circuits which supply outputs to a differential amplifier 60. The summed output of the differential amplifier is smoothed in a low pass filter 32 before being applied to an output amplifier 34 which supplies the flow rate output signal.

A preferred oscillator 36 contains a control circuit (not shown) to enable it to operate periodically, for example ten times per second for a duration of five milliseconds. During that operating time, a preferred oscillator frequency may be about 10 KHz, which is preferably controlled by a frequency controller 42 to adjust the frequency in order to produce fifty cycles of the largest possible magnitude signal across the current sensing resistor. This signal occurs at the frequency where the capacitor 46 is series resonant with the inductance of the electromagnet. At resonance, the flywheel effect of the circuit allows the current to build up with successive cycles, as determined by the circuit Q, to relatively large values. When the Q values are high a number of resonant periods are required to build up the current to a relatively stable value so that the zero change detector does not begin to provide the sample and hold circuits with enable pulses until that stable value is reached.

When the capacitor and magnet inductance are in resonant operation the voltage across the coil of the electromagnet is phase shifted ninety degrees with respect to the current so that the voltage crosses zero when its current is at a maximum. At this maximum the electromagnet current is stable, which allows the detection operation to be carried out. Whatever means are incorporated, the zero change detector may simply detect a voltage polarity change or may incorporate a window detector to detect that crossing. Sensing the voltage, as indicated by the dash-dot line 15, provides another way to detect electromagnet current. Additionally, one can incorporate a voltage offset that allows detection a bit before the current peak so that a sample and hold circuit can be enabled just before and just after the peak.

In a conventionally configured full bore magnetic flow meter the Q of the magnet may be relatively low. This implies that the build up of current during resonant operation is a small factor for a design consideration. In a magnetic probe configuration, however, the Q can be high enough to make a substantial difference. This is particularly evident with magnets having low loss cores, such as powdered iron, as a significant part of the magnetic path. In such situations, Qs of five to ten are readily achieved. Because the strength of the magnetic field is proportional to the magnet current and the flow induced magnitude of the electrode voltages are proportional to the magnitude of the magnetic field, the peak detected electrode voltages are 5 to 10 times greater than for non-resonant operation. This enables an electromagnet in a probe configuration to pass peak currents of 30 to 60 amperes when resonantly operated. As an example, a coil having a 2.5 ohm resistance and conventionally pulse energized with 15 volts will pass a current of 6.0 amperes when fully stabilized. The resulting increase in signal makes the meter correspondingly more stable and tolerant of interfering signals.

Figure 3:
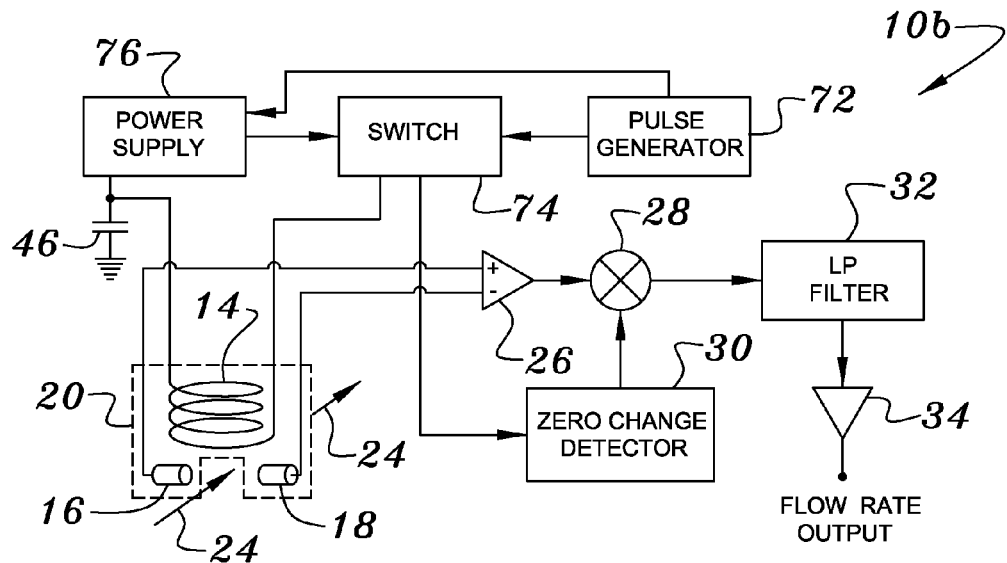
FIG. 3 is a schematic block diagram of a single pulse flow meter of the invention.
Figure 4:
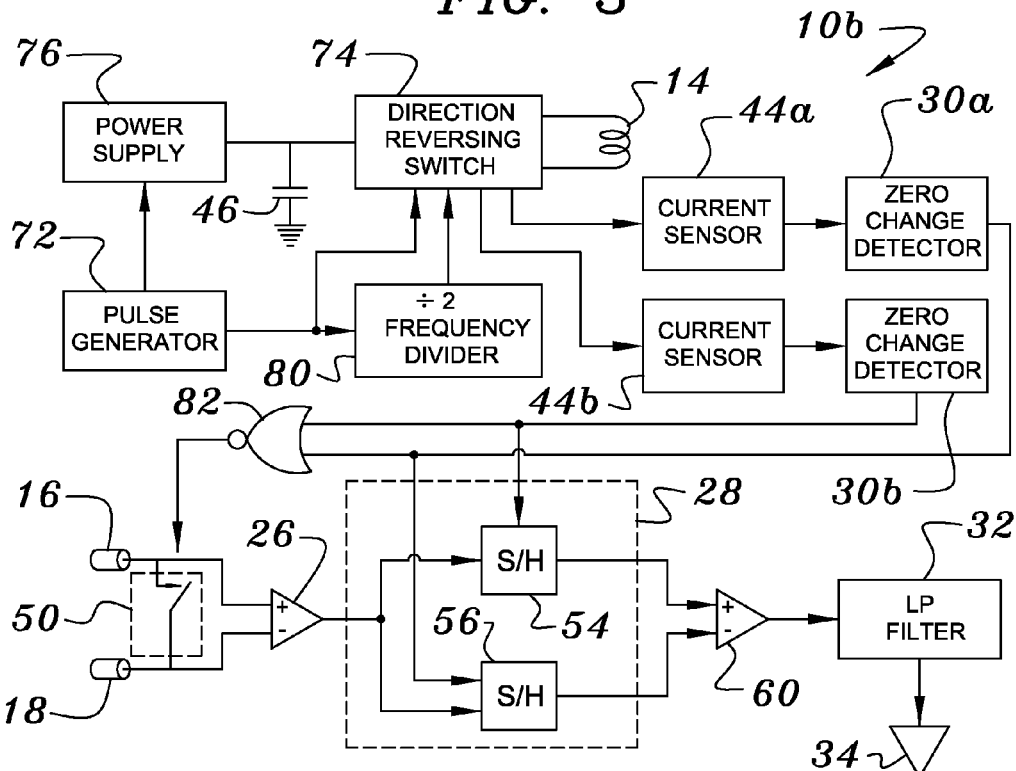
FIG. 4 is a schematic block diagram of a preferred embodiment of the flow meter of FIG. 3.

An alternate resonant arrangement for energizing the electromagnet is to charge the resonating capacitor to a relatively high voltage and to then switch the magnet across the capacitor to supply the coil energy in a single pulse. A preferred embodiment of such an arrangement is depicted in FIG. 3 and FIG. 4. The power supply charging the capacitor is disconnected from the capacitor, or is of the constant current type so that it does not significantly affect the voltage across the capacitor while it is energizing the coil. At the beginning of the pulse the current through the coil is low and increases while the capacitor voltage starts high and falls. At a time determined largely by the resonant frequency of the electromagnet's inductance and the capacitance value of the capacitor, the current through the coil reaches a peak and stops changing for a short period of time after which it starts to diminish. That peak time within the resonant period is detected and the sample and hold circuits are enabled to sample and store the difference in the amplified electrode voltages. In a preferred embodiment the current is switched through the coil in alternate directions and two sample and hold circuits store the electrode difference voltages for each of the directions, the voltage difference between those circuits then being smoothed and amplified to provide the output flow rate signal.

In FIG. 3, a preferred embodiment of the flow meter 10b of the present invention has, as a current source, a combination of a power supply 76 and a capacitor 46 connected to one side of the coil of the electromagnet 14. The other side of the coil of the electromagnet is connected to a switch 74 operated responsive to a signal from a pulse generator 72. The lower end of the magnet projects its flux into the flowing fluid as indicated by arrows 24, thus generating an electrical potential in the fluid which is sensed at the electrodes 16, 18. A differential amplifier 26 amplifies the electrode potential difference and provides its output signal to an amplitude detector 28 which is enabled only during the time intervals when the magnetic flux is at a maximum and is essentially not changing. The output from a detector 28 is smoothed by the low pass filter 32 and fed to an output amplifier 34 to provide the flow rate output signal.

The power supply charges the capacitor 46 to a preset maximum voltage and maintains this voltage until the normally open switch 74 receives a short rectangular signal from the pulse generator 72. The switch 74 then switches into its conducting state to energize the magnet. In this arrangement the voltage across the capacitor and the coil of the magnet behave in a manner characteristic of a resonant circuit. At a time determined largely by the resonant frequency of the inductance of the coil and the capacitance value of the capacitor, the current through the magnet reaches a peak, becomes temporarily invariant, and then starts to diminish. A zero change detector 30 detects the switch peak current when the magnet current is not changing and produces a pulse at that time. This enables the amplitude detector 28, typically a sample and hold circuit, to detect and store the amplified differential electrode voltage. That voltage is smoothed by the low pass filter and amplified by the output amplifier to provide the flow rate output signal.

FIG. 4 provides details of a preferred embodiment of the flow meter 10b. In this example a power supply 76 charges a capacitor 46 to a preset voltage and then disconnects from the capacitor. A pulse generator 72 switches the direction reversing switch 74 to a conducting state for a short period of time during which the capacitor supplies energy to the coil 14. The current through the coil increases, reaches a peak, and then decreases. Alternatively, one can leave the power supply connected to the capacitor for an initial portion of the pulse during which the current flows through the coil to provide a significantly higher maximum coil current before resonant operation commences. At the instant of the current peak, when the current is not changing, current sensors 44a, 44b and zero current change detectors 30a, 30b produce pulses to enable the corresponding sample and hold detectors 54, 56 to detect the amplitude of the differential electrode voltage. The pulse generator also provides a signal to the frequency divider 80 which produces an output signal at ½ its input frequency to change the direction of the current flow through the magnet. The current sensing signals are alternately detected by the current sensors and, when detected, produce corresponding enable pulses which are routed to their corresponding sample and hold detectors to sample the voltages provided by the differential amplifier 26 and originating from electrodes 16 and 18. A single current sensor detecting power supply current prior to current direction switching, and a single zero current change detector with selective switching to the sample and hold detectors could alternately be used.

The current pulse through the magnet typically has a duration of a fraction of a millisecond to several milliseconds and typically occurs at a relatively slow repetition rate, for example ten times per second. In actual practice, this rate is set to not be close to an integrally divisible entity of the local electrical power mains frequency so that the low pass filter can remove the resulting beat frequency signals. For 60 Hz mains power a repetition rate of 11.5 time per second would be exemplary.

Once the sample and hold circuits have operated during a measurement cycle, the current pulse is switched off. The magnet's magnetic field collapses, generating a current which, when fed through a rectifier or switch, returns most of the energy in the field to the capacitor and thereby reduces the average power used to generate the field. By contrast, prior art arrangements usually provide for a regulated constant magnet current for a period of time which dissipates much more energy in the form of heat.

The zero current change detectors 30a, 30b are typically peak voltage detectors having long time constants and sense the voltage developed by current sensors such as resistors or current transformers. The equivalent sensing may also be performed by Hall effect sensors directly sensing the magnet's field. In a preferred embodiment, a current transformer is used in order to provide both the timing signal and isolation. The use of the current transformer also allows one to measure the envelope of the current and to use that measurement in a span control arrangement that compensates for thermal variations of the various circuit components. Other types of detectors employing phase shifting with zero crossing detection and digital processing means known in the current art are also applicable.

In the depiction of FIG. 4, outputs from the zero current change detectors are fed into a NOR gate 82 which optionally enables a switch 50 when the sample and hold circuits are not being enabled. The switches discharge electrolytic potentials at the electrode surfaces in contact with the fluid and thereby tend to stabilize them. The switches may also be programmed to open at times to enable fluid conductivity to be measured. They may also serve to protect the amplifier 26 from damaging signal levels and to minimize excessive input voltages which may prevent some amplifiers from promptly recovering and assuming normal operation during the time when flow detection takes place.

The amplified differential electrode voltages are detected in a narrow time window encompassing the time at which the current is at a maximum and is minimally changing. This ensures that electrode voltages directly induced into the electrodes by capacitance or inductive fields, which could easily be much larger than the voltages generated by the fluid flow, become a manageable factor. Along these lines, efforts are made to cancel these fields by fundamental mechanical design and by the symmetrical placement and shielding of electrode and magnet connecting wires. At higher operating frequencies the effects of nearby magnetic and/or electrically conductive components, such as meter tubes, housings, or metal pipes may need to be taken into account in determining the suitability of the present invention for a particular application.

The flow sensing probes configured as in FIG. 9 in my U.S. Pat. Nos. 6,431,011 and 6,463,807 are particularly well suited to use the present invention to advantage because the paired electrodes are symmetrically located on both sides of the magnet and the magnetic flux, when compared to that in a conventional full bore magnetic flow meter, can be relatively isolated from proximity to surrounding conductors. Furthermore, a relatively small and manageable probe magnetic core upon which the magnet winding is wound can be selected for low losses. This can enable a relatively high resonant frequency to be employed. A higher frequency will enable the size of the capacitor and the magnet current pulse width to be reduced, which will make a product employing the invention more energy efficient and/or resistant to environmental noise.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A magnetic flow meter for measuring a flow rate of a fluid flowing along a flow direction, the magnetic flow meter comprising:

an electromagnet operable to produce a magnetic field transverse to the flow direction when current from a source thereof flows through a coil portion of the electromagnet, the current source selected for resonant operation with the electromagnet;

at least one pair of electrodes spaced apart along a line transverse to both the magnetic field and the flow direction; and a magnetic field sensor operable to provide an output representative of a magnitude of the magnetic field to a timing circuit operable to determine when the magnitude of the field is invariant with time within a resonant period, the timing circuit having an output to a signal voltage measurement circuit operable to sample a respective voltage between the two electrodes of the at least one pair thereof responsive to the output from the timing circuit.

2. The flow meter of claim 1 wherein the current source comprises a capacitor connected to an oscillator operable under control of a frequency controller to deliver a selected number of pulses to the capacitor for resonant operation of the electromagnet.

3. The flow meter of claim 1 wherein the current source comprises a power supply, a capacitor and at least one switch, the switch operable under control of a pulse generator to connect the capacitor to the coil for a time less than a resonant period determined by a capacitance value of the capacitor and an inductance value of the electromagnet.

4. The flow meter of claim 1 wherein the magnetic field sensor comprises a current sensor connected between the coil and the signal voltage measurement circuit.

5. The flow meter of claim 1 wherein the signal measurement circuit comprises at least one sample and hold circuit.

6. The flow meter of claim 1 wherein the timing circuit comprises a zero change detector.

7. The flow meter of claim 1 wherein the at least one pair of electrodes comprises two pairs disposed on a probe.

8. A method of operating a magnetic flow meter for measuring a flow rate of a fluid flowing along a flow direction, the method comprising the steps of:

applying, from a pulsed current source, at least one current pulse to an electromagnet having a coil axis arranged transverse to the flow direction, the at least one current pulse supplied at a frequency selected for resonant operation of the electromagnet;

measuring a magnitude of a magnetic field generated by the electromagnet during the at least one pulse and determining at least one instant, within a period of the resonant operation, during which the magnetic field is temporarily invariant; and measuring a voltage between two electrodes contacting the fluid and spaced apart along a line transverse to both the flow direction and the coil axis during the at least one instant and calculating the flow rate therefrom.

9. The method of claim 8 wherein the applying step comprises applying exactly one current pulse.

10. The method of claim 9 wherein the source comprises a power supply connected to a capacitor and wherein both the power supply and the capacitor are connected to the coil during an initial portion of the exactly one current pulse.

11. The method of claim 8 wherein the applying step comprises applying a selected plurality of current pulses.

12. The method of claim 8 wherein the magnitude of the magnetic field is measured by measuring a current delivered to the coil.

* * * * *